(12) United States Patent
Matsushita

(10) Patent No.: US 10,179,417 B2
(45) Date of Patent: Jan. 15, 2019

(54) CUTTING TOOL

(71) Applicant: TOHO KOKI CO., LTD., Yamatokoriyama-shi, Nara (JP)

(72) Inventor: Nobuo Matsushita, Yamatokoriyama (JP)

(73) Assignee: TOHO KOKI CO., LTD., Yamatokoriyama-Shi, Nara (JP)

( * ) Notice: Subject to any disclaimer, the term of this patent is extended or adjusted under 35 U.S.C. 154(b) by 226 days.

(21) Appl. No.: 14/906,674

(22) PCT Filed: Oct. 21, 2014

(86) PCT No.: PCT/JP2014/077938
§ 371 (c)(1),
(2) Date: Jan. 21, 2016

(87) PCT Pub. No.: WO2015/114893
PCT Pub. Date: Aug. 6, 2015

(65) Prior Publication Data
US 2016/0158946 A1 Jun. 9, 2016

(30) Foreign Application Priority Data

Feb. 3, 2014 (JP) .................. 2014-018594

(51) Int. Cl.
*B25G 1/06* (2006.01)
*A01G 3/02* (2006.01)
(Continued)

(52) U.S. Cl.
CPC ............ *B26B 17/02* (2013.01); *A01G 3/0251* (2013.01); *B25G 1/06* (2013.01); *B25G 1/066* (2013.01)

(58) Field of Classification Search
CPC ........ B26B 17/02; A01G 3/02; A01G 3/0251; A01G 3/083; A01G 3/0475; A01G 3/065;
(Continued)

(56) References Cited

U.S. PATENT DOCUMENTS

| 733,919 | A | * | 7/1903 | Schwartz | ............... | A01G 3/065 |
| | | | | | | 30/248 |
| 1,215,308 | A | * | 2/1917 | Johnson | ................ | B25B 15/007 |
| | | | | | | 7/138 |

(Continued)

FOREIGN PATENT DOCUMENTS

| CN | 28006058 Y | 8/2006 |
| CN | 2806055 Y | 8/2009 |

(Continued)

OTHER PUBLICATIONS

CN101816263 English translation; Matsushita Nobuo; Sep. 2010; A01G03/047.*

*Primary Examiner* — Laura M Lee
(74) *Attorney, Agent, or Firm* — Birch, Stewart, Kolasch & Birch, LLP

(57) ABSTRACT

Provided is a cutting tool with which an operator can cut a to-be-cut material by grasping a second handle while setting a first handle stably, and in which the first handle can be changed from a stably-set mode to a grippable mode as with the second handle. The cutting tool has a sidewardly-protruding extension component disposed at the base end of the first handle, which is installed so that, with respect to a handle main body of the first handle, it can be freely changed between a transverse position substantially aligned with the axial direction of the pivotal shaft and a longitudinal position aligned with the lengthwise direction of the handle main body, and, a position holding mechanism is disposed (Continued)

between the extension component and the handle main body, for holding the extension component in each position.

6 Claims, 9 Drawing Sheets

(51) Int. Cl.
*B26B 17/02* (2006.01)
*A01G 3/025* (2006.01)

(58) Field of Classification Search
CPC .... A01G 2003/023; B25G 1/06; B25G 1/063; B25G 1/066; B25G 3/00–3/38
USPC ................ 30/191, 192, 193, 250, 251, 252; 81/177.8–177.9, 427.5; 403/99
See application file for complete search history.

(56) References Cited

U.S. PATENT DOCUMENTS

| | | | | |
|---|---|---|---|---|
| 1,370,906 A | * | 3/1921 | Newton | B26B 13/005 30/255 |
| 1,431,805 A | * | 10/1922 | Hrenczuk | B25F 1/00 81/177.1 |
| 1,461,270 A | * | 7/1923 | Garrison | B25B 7/00 81/427.5 |
| 1,836,967 A | * | 12/1931 | Helwig | B23D 29/023 30/192 |
| 2,020,242 A | * | 11/1935 | Geddes | B26B 17/02 30/177 |
| 2,126,699 A | * | 8/1938 | Florian | B26B 13/005 30/161 |
| 2,556,995 A | * | 6/1951 | Coffing | G05G 1/08 403/92 |
| 2,952,912 A | * | 9/1960 | Crawford | B26B 13/005 30/255 |
| 3,773,094 A | * | 11/1973 | Kuenzel | B25G 1/066 81/177.8 |
| 5,085,433 A | * | 2/1992 | Parsons | F41C 23/16 42/1.16 |
| 5,722,171 A | * | 3/1998 | Schmidt | B26B 13/12 30/255 |
| 6,108,845 A | * | 8/2000 | Hung | B25F 1/02 30/260 |
| 6,131,971 A | * | 10/2000 | Chen | A01B 1/022 294/51 |
| 6,161,291 A | * | 12/2000 | DiMatteo | A01G 3/0251 30/192 |
| 6,249,976 B1 | * | 6/2001 | Osame | B26B 13/04 30/199 |
| 6,370,992 B1 | * | 4/2002 | Shih-Kuei | B25B 7/00 81/177.7 |
| 6,398,653 B1 | * | 6/2002 | Chang | F41B 15/02 16/900 |
| 7,007,387 B2 | * | 3/2006 | Kuzuu | A45D 29/02 30/192 |
| 7,845,082 B2 | * | 12/2010 | Demar | A01G 3/02 30/177 |
| 8,347,765 B2 | * | 1/2013 | Chen | B25B 7/04 81/177.7 |
| 2005/0246900 A1 | * | 11/2005 | Simpson | A01G 3/0251 30/153 |
| 2006/0230886 A1 | * | 10/2006 | Hsien | B25G 1/06 81/424 |
| 2007/0163401 A1 | * | 7/2007 | Hsieh | B25B 7/02 81/177.7 |
| 2009/0007733 A1 | * | 1/2009 | Robinson | B25B 7/00 81/387 |
| 2009/0293288 A1 | * | 12/2009 | Hernandez | B26B 13/26 30/251 |
| 2010/0083509 A1 | * | 4/2010 | Grist | B26B 13/005 30/341 |
| 2010/0107828 A1 | * | 5/2010 | Huerta | B25B 13/461 81/177.9 |
| 2013/0205601 A1 | * | 8/2013 | Wu | B25G 3/38 30/255 |

FOREIGN PATENT DOCUMENTS

| | | | | |
|---|---|---|---|---|
| CN | 101816263 | * | 9/2010 | ............ A01G 3/047 |
| CN | 101816263 A | | 9/2010 | |
| CN | 201872094 U | | 6/2011 | |
| DE | 20005825 U1 | | 6/2000 | |
| EP | 2 628 383 A1 | | 8/2013 | |
| JP | 63-160144 U | | 10/1988 | |
| JP | 6-24440 U | | 4/1994 | |
| JP | 7-42574 Y2 | | 10/1995 | |
| JP | 8-154491 A | | 8/1996 | |
| JP | 2000-218068 A | | 8/2000 | |
| JP | 3109603 U | | 5/2005 | |
| TW | 348096 U | | 12/1998 | |
| TW | 418773 U | | 1/2001 | |
| TW | M302443 U | | 12/2006 | |

\* cited by examiner

CUTTING TOOL

CROSS-REFERENCE TO RELATED APPLICATIONS

The present application claims priority under 35 U.S.C. § 119 to Japanese Patent Application No. 2014-018594, filed Feb. 3, 2014. The content of this application is incorporated herein by reference in its entirety.

TECHNICAL FIELD

The present invention relates to a cutting tool designed to cut a material to be cut by opening and closing a pair of cutting blade bodies through opening-closing operation of a first handle and a second handle.

BACKGROUND ART

There is a cutting tool for cutting a material to be cut such as a wire, a cable, a bar, a tubing, and so forth, which comprises a pair of cutting blade bodies, and a first handle and a second handle coupled to the cutting blade bodies. This cutting tool is designed to cut a to-be-cut material by opening and closing the paired cutting blade bodies through opening-closing operation of the first and second handles.

In a cutting tool of such a conventional type, the front end side of the first handle is annexed with a circular plate or is securely fitted with a rolling preventive plate, and, with this construction, an operator is able to cut a to-be-cut material with greater force by following a step of setting the first handle stably by pushing down the circular plate or rolling preventive plate with his/her foot, and a step of carrying out opening-closing operation of the first handle by grasping the second handle with his/her hands while keeping his/her weight thereon (refer to Patent literatures 1 and 2, for example).

PRIOR ART REFERENCE

Patent Literature

Patent literature 1: Japanese Utility Model Registration No. 3109603
Patent literature 2: Japanese Examined Utility Model Publication JP-Y2 7-42574 (1995)

SUMMARY OF THE INVENTION

Problems to be Solved by the Invention

In the conventional construction, however, since the circular plate or rolling preventive plate is unretractably attached to the front end side of the first handle, in a case where an operator cuts a to-be-cut material by grasping the first and second handles with his/her hands, the circular plate or rolling preventive plate constitutes an obstruction to cutting operation, and consequently the to-be-cut material cannot be cut with ease, thus causing inconvenience.

The present invention has been devised in view of the problems as mentioned supra, and accordingly its object is to provide a cutting tool with which an operator is able to cut a material to be cut by grasping a second handle while setting a first handle stably, and in which the first handle can be changed from a stably-set mode to a grippable mode as with the second handle.

Means for Solving the Problem

The following is specific problem-solving means pursuant to the present invention.

According to technical means of the present invention for solving the technical problems, there is provided a cutting tool comprising: a first handle 5 and a second handle 6 coupled to each other via a pivotal shaft 17; cutting blade bodies 3 and 4 coupled to front end sides of, respectively, the first and second handles 5 and 6; a sidewardly-protruding extension component 29 disposed at a base end side of the first handle 5, which is installed so that, with respect to a handle main body 11 of the first handle 5, it can be freely changed in position between a transverse position X which is substantially aligned with an axial direction of the pivotal shaft 17 and a longitudinal position Y which is aligned with a lengthwise direction of the handle main body; and a position holding mechanism 45 disposed between the extension component 29 and the handle main body 11, for holding the extension component 29 in each of the positions X and Y.

Moreover, in another aspect of the technical means of the present invention, the first handle 5 is constructed by coupling the extension component 29 to the base end of the handle main body 11, and, the extension component 29 serves as a handle grip when it is in the longitudinal position Y.

Moreover, in another aspect of the technical means of the present invention, the extension component 29 comprises: a component coupling member 33 coupled, via a pivot 31, to a main body coupling member 30 disposed at the base end of the handle main body 11; and a cylindrical member 34 fitted externally to the component coupling member 33, which passes over the pivot 31 into engagement with the main body coupling member 30 so as to assume the longitudinal position Y.

The extension component 29 is allowed to rotate about the pivot 31 upon disengagement of the cylindrical member 34 from the main body coupling member 30, and is restrained against rotation about the pivot 31 upon abutting of the front end of the cylindrical member 34 on the main body coupling member 30 in the transverse position X.

Moreover, in another aspect of the technical means of the present invention, the position holding mechanism 45 comprises: longitudinally positioning means 47 for restraining the cylindrical member 34 against movement relative to the main body coupling member 30 when the extension component 29 is in the longitudinal position Y; transversely positioning means 48 for restraining the cylindrical member 34 against movement relative to the component coupling member 33 when the extension component 29 is in the transverse position X; and release means 49 disposed in the extension component 29, for releasing restraint imposed by the longitudinally positioning means 47 and the transversely positioning means 48.

Moreover, instill another aspect of the technical means of the present invention, the cylindrical member 34 of the extension component 29 is formed with an engagement hole 43. The longitudinally positioning means 47 has a positioning pin 51 which protrudes from the interior of the main body coupling member 30 so as to be engaged in the engagement hole 43, and the transversely positioning means 48 has a positioning pin 55 which protrudes from the interior of the component coupling member 33 so as to be engaged in the engagement hole 43, and also, the release means 49 has a push pin 59 situated inside the engagement hole 43, which acts to push each of the positioning pins 51 and 55 out of the engagement hole 43 when pressed.

Moreover, in still another aspect of the technical means of the present invention, the position holding mechanism 45 has guide means 63 for causing the cylindrical member 34 to move circumferentially relative to the main body coupling member 30 in the longitudinal position Y and whereafter permitting its axial movement, and also causing the cylindrical member 34 to move circumferentially relative to the component coupling member 33 in the transverse position X and whereafter permitting its axial movement.

Moreover, in yet another aspect of the technical means of the present invention, the guide means 63 comprises: a locking projection 65 formed in the cylindrical member 34; a first circumferential groove 67 and a second circumferential groove 68 for retaining the locking projection 65 formed in the main body coupling member 30 and the component coupling member 33, respectively; a first linear groove 69 for guiding the locking projection 65 in axial movement from the first circumferential groove 67 to the end face of the main body coupling member 30; and a second linear groove 70 which is positioned so as to become an extension of the first linear groove 69 in the longitudinal position Y, for guiding the locking projection 65 in axial movement from the end face of the component coupling member 33 to a position beyond the second circumferential groove 68.

Advantageous Effects of the Invention

According to the present invention, the sidewardly-protruding extension component is attached to the base end side of the first handle so as to be freely changed in position between the transverse position which is substantially aligned with the axial direction of the pivotal shaft and the longitudinal position which is aligned with the lengthwise direction of the handle main body relative to the handle main body of the first handle, and, the position holding mechanism for holding the extension component in each of the positions is disposed between the extension component and the handle main body. Accordingly, the extension component of the first handle can be readily held in the longitudinal position aligned with the lengthwise direction of the handle main body without fail, and an operator is thus able to cut a material to be cut easily by grasping the first and second handles. Furthermore, the extension component can also be readily held in the transverse position which is substantially aligned with the axial direction of the pivotal shaft without fail, and the first handle can be set stably by utilizing the extension component, wherefore an operator is able to grasp only the second handle with his/her hands while pushing down the first handle placed in a stable condition by his/her foot, and consequently a to-be-cut material can be cut smoothly with greater force.

MODES FOR CARRYING OUT THE INVENTION

Hereinafter, embodiments of the present invention will be described with reference to drawings.

Figure 1:
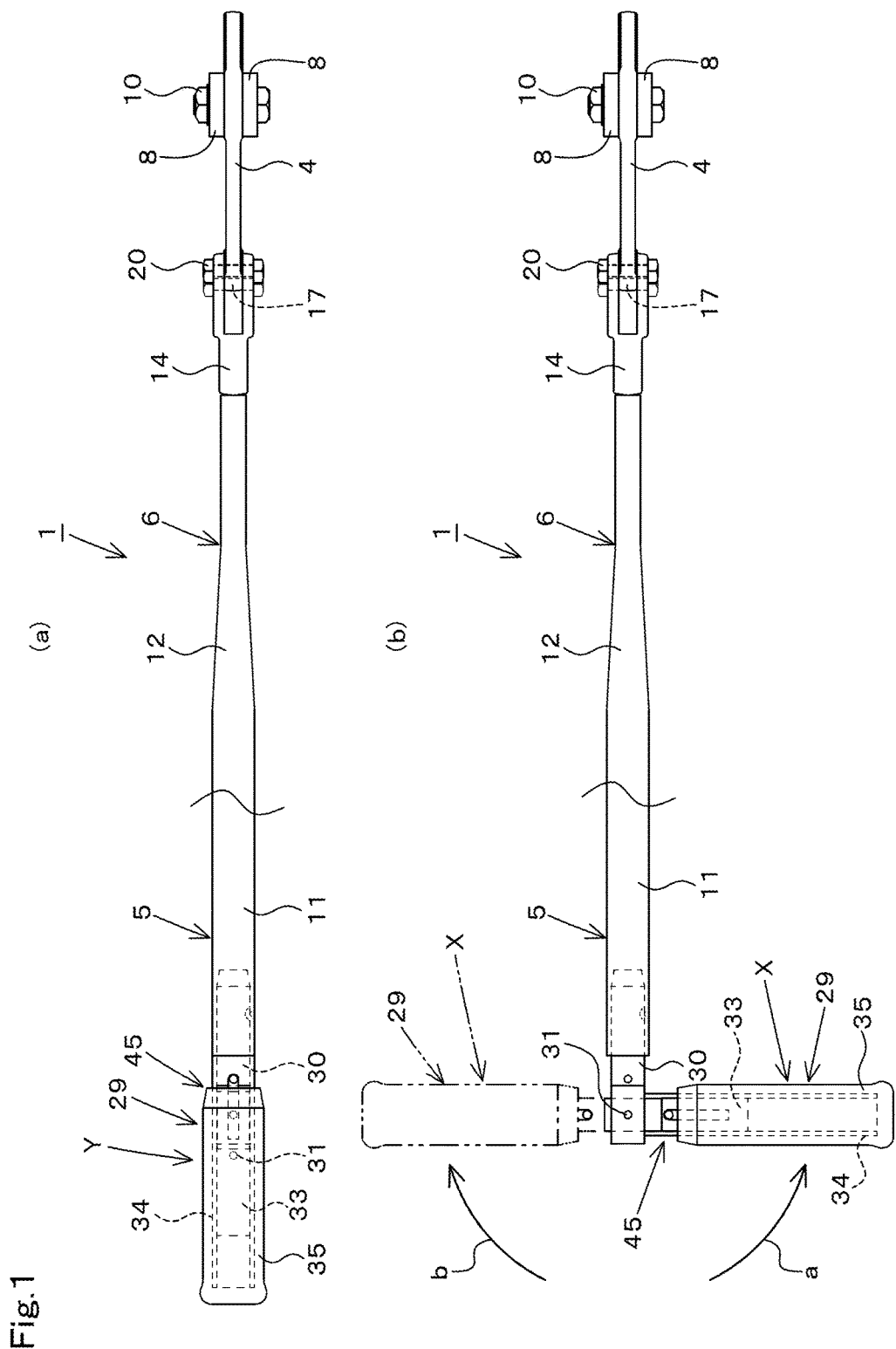
FIG. 1 shows a cutting tool in accordance with the first embodiment of the present invention, and more specifically FIG. 1(*a*) is a plan view of an extension component set in a longitudinal position, and FIG. 1(*b*) is a plan view of the extension component set in a transverse position.
Figure 2:
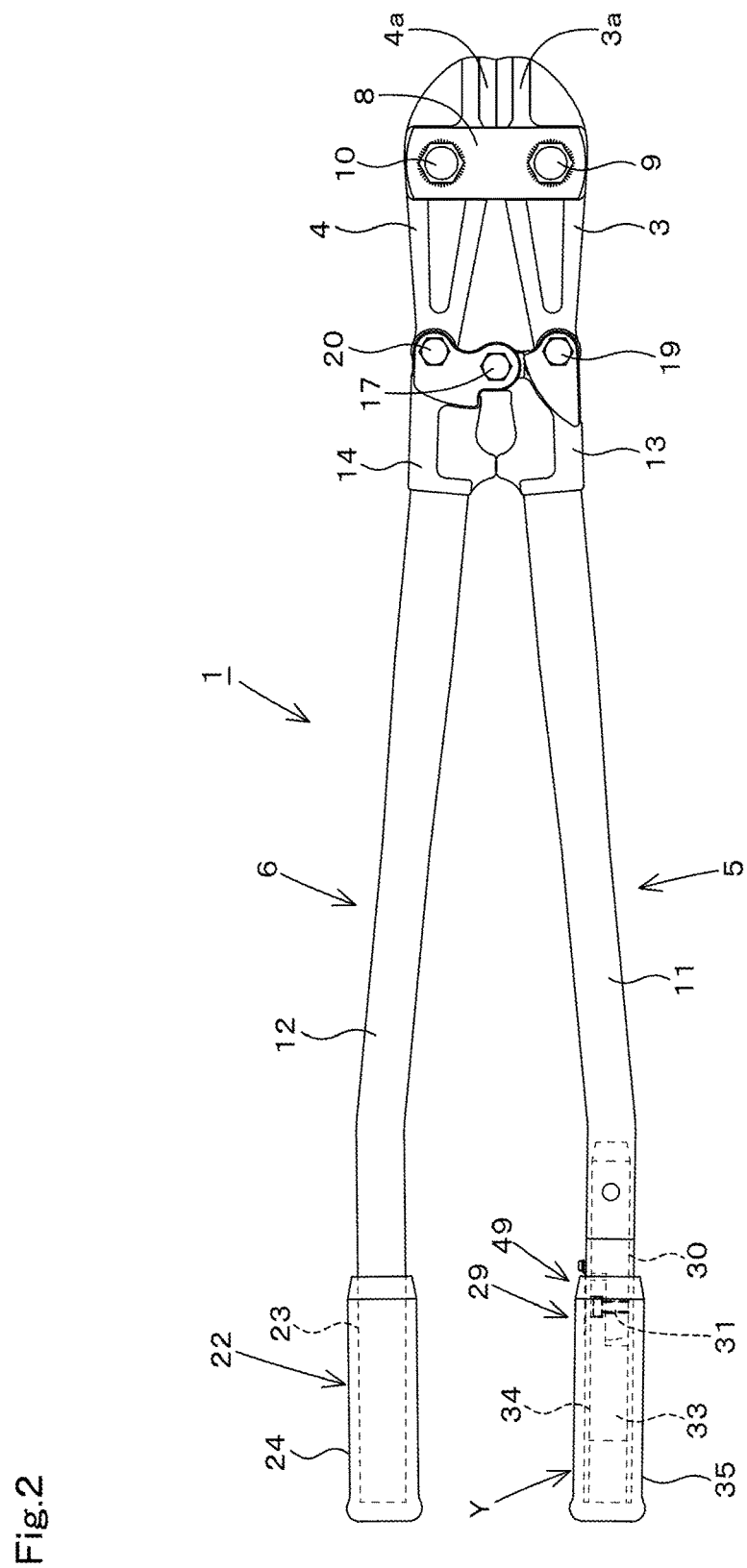
FIG. 2 is a front view of the cutting tool.

FIGS. 1 to 8 show the first embodiment of the present invention. In FIGS. 1 and 2, a cutting tool 1 comprises: a pair of cutting blade bodies 3 and 4 having formed at their front ends cutting blades 3*a* and 4*a*, respectively; and a first handle 5 and a second handle 6 coupled to the cutting blade bodies 3 and 4, respectively. The paired cutting blade bodies 3 and 4 are each held so as to be sandwiched between a pair of coupling plates 8 arranged in a thickness direction, and are openably and closably supported by a pair of support shafts 9 and 10, respectively, disposed so as to pass through the coupling plates 8.

The first handle 5 and the second handle 6 comprise a handle main body 11 and a handle main body 12, respectively, made of a tubular material in cylindrical form. Mounting members 13 and 14 are fixedly attached to the front ends of, respectively, the handle main bodies 11 and 12, and, both of the mounting members 13 and 14 are rotatably coupled to a pivotal shaft 17. Moreover, the paired handle main bodies 11 and 12 are rotatably coupled, via the mounting members 13 and 14, respectively, to their respective cutting blade bodies 3 and 4 by coupling shafts 19 and 20, respectively.

Thus, the cutting tool is designed to cut a material to be cut by opening and closing the paired cutting blade bodies 3 and 4 about the support shafts 9 and 10, respectively, through opening-closing operation of the first handle 5 and the second handle 6 about the pivotal shaft 17. The axis of the pivotal shaft 17 is perpendicular to a direction in which the cutting blade bodies 3 and 4, and the first and second handles 5 and 6 are rotationally moved (rotation surface).

The second handle 6 has, at its base end side, a handle grip 22 extending along the direction of the length of the handle main body. The handle grip 22 is constructed by fitting and fixing a synthetic resin-made cover member 24 externally to a cylindrical portion 23 which is an extension of the handle main body 12.

In FIGS. 1 to 8, the first handle 5 has an extension component 29 formed at its base end side so as to extend sideward. The extension component 29 comprises: a component coupling member 33 coupled, via a pivot 31, to a main body coupling member 30 disposed at the base end of the handle main body 11; and a cylindrical member 34 fitted externally to the component coupling member 33, which passes over the pivot 31 into engagement with the main body coupling member 30 so as to assume an extended position, or equivalently longitudinal position. A synthetic resin-made cover member 35 is fixedly fitted to the cylindrical member 34 exteriorly thereof.

The main body coupling member 30 has its front half part fixedly fitted to the base end of the handle main body 11 of the first handle 5 interiorly thereof, and has its rear half part extended rearward. An engagement recess 26 is formed in the front half part of the main body coupling member 30, and, the base portion of the handle main body 11 is formed with an inwardly-extending engagement projection 27 corresponding to the engagement recess 26. Upon engagement of the engagement projection 27 in the engagement recess 26, the main body coupling member 30 is inhibited from detachment from the handle main body.

The front part of the component coupling member 33 is bendably coupled to the rear half part of the main body coupling member 30 via the pivot 31. The pivot 31 is substantially perpendicular to the pivotal shaft 17, so that the component coupling member 33 is free to rotate in a direction perpendicular to a cutting direction in which cutting is effected by the cutting blade body 3, 4.

The main body coupling member 30 and the component coupling member 33 are each shaped like a round bar. A coupling projection 37 in the form of a half-round bar is formed at a component coupling member 33—side end (rear half part) of the main body coupling member 30, and a coupling projection 38 in the form of a half-round bar is formed at a main body coupling member 30—side end of the component coupling member 33. The coupling projection 37 and the coupling projection 38 are arranged with their flat surfaces opposed to each other, and a junction between the opposed surfaces is parallel to the axis of the main body coupling member 30, but is displaced from the axis in a radial direction.

The pivot 31 is constructed of a bolt, and, the coupling projections 37 and 38 disposed in overlapping relation to each other are rotatably coupled to each other by the pivot 31. Upon the component coupling member 33 being brought into an extended state relative to the main body coupling member 30, the coupling projections 37 and 38 are combined into a single round bar form.

The coupling projection 38 of the component coupling member 33 is made short to such an extent as to be spaced away from a step end face 30a of the main body coupling member 30 under a condition where the component coupling member 33 is in an extended state relative to the main body coupling member 30, and, the component coupling member 33 is made free to bend about the pivot 31 in a direction indicated by an arrow a, as well as in a reverse direction indicated by an arrow b, relative to the main body coupling member 30.

Thus, the first handle 5 is formed by coupling the extension component 29 to the base end of the handle main body 11. The extension component 29 is freely changed in position between a transverse position X which is substantially aligned with the direction of the axis of the pivotal shaft 17 and a longitudinal position Y which is aligned with the direction of the length of the handle main body, and, the extension component 29 serves as a handle grip when it is in the longitudinal position Y.

Moreover, as indicated by a solid line in FIG. 1(b), the extension component 29 is designed to assume both of a transverse position X to which it is moved by being bent in the arrow a direction relative to the handle main body 11 and another transverse position X to which it is moved by being bent in the arrow b direction relative to the handle main body 11.

The cylindrical member 34, which is made of a tubular material, is slidably (movably) fitted, while being retained, to the component coupling member 33 exteriorly thereof, and is also slidably (movably) fitted to the main body coupling member 30 exteriorly thereof in a manner permitting free detachment.

That part of a handle main body 11—side end of the cylindrical member 34 which lies outside of the cover member 35 is formed with an engagement hole 43 drilled all the way through from the inner side to the outer side of the cylindrical member 34 in the radial direction.

In a region between the extension component 29 and the handle main body 11, a position holding mechanism 45 is disposed to change the position of the extension component 29 from the transverse position X to the longitudinal position Y and vice versa, as well as to hold the extension component 29 in a changed position.

The position holding mechanism 45, which is formed so as to span the main body coupling member 30, the component coupling member 33, and the cylindrical member 34, is designed to operate in a manner such that, when the component coupling member 33 is bent at substantially a right angle with respect to the main body coupling member 30, the cylindrical member 34 is moved toward the main body coupling member 30 relative to the component coupling member 33 so as to abut on the projecting end (coupling projection 37) of the main body coupling member 30, thereby locating and holding the extension component 29 in the transverse position X in a state of being bent at substantially a right angle with respect to the handle main body 11, and that, when the component coupling member 33 is brought into an extended state relative to the main body coupling member 30, the cylindrical member 34 is externally fitted in straddling relation to the main body coupling member 30 and the component coupling member 33, thereby locating and holding the extension component 29 in the longitudinal position Y.

The extension component 29 is allowed to rotate about the pivot 31 upon disengagement of the cylindrical member 34 from the main body coupling member 30, and is restrained against rotation about the pivot 31 upon abutting of the front end of the cylindrical member 34 on the main body coupling member 30 in the transverse position X.

The position holding mechanism 45 comprises: longitudinally positioning means 47 for restraining the cylindrical member 34 against movement relative to the main body coupling member 30 when the extension component 29 is in the longitudinal position Y; transversely positioning means 48 for restraining the cylindrical member 34 against movement relative to the component coupling member 33 when the extension component 29 is in the transverse position X; release means 49 disposed in the extension component 29, for releasing restraint imposed by the longitudinally positioning means 47 and the transversely positioning means 48; and guide means 63 for causing the cylindrical member 34 to move circumferentially relative to the main body coupling member 30 in the longitudinal position Y and whereafter permitting its axial movement, and also causing the cylindrical member 34 to move circumferentially relative to the component coupling member 33 in the transverse position X and whereafter permitting its axial movement.

The longitudinally positioning means 47 comprises a positioning pin 51 which extends from the interior of the main body coupling member 30 so as to be engaged in the engagement hole 43 of the cylindrical member 34. The positioning pin 51 is housed, while being retained, for free radially-outward advancing/retracting movement in a main body holding hole 52 formed radially in the main body coupling member 30, and is urged radially outwardly by a coil spring (urging member) 53. In this structure, upon the extension component 29 being located in the longitudinal position Y, the positioning pin 51 is disengageably engaged in the engagement hole 43 so as to restrain the cylindrical member 34 against circumferential movement relative to the main body coupling member 30 and axial movement, thereby holding (locking) the extension component 29 in the longitudinal position Y.

The transversely positioning means 48 comprises a positioning pin 55 which extends from the interior of the component coupling member 33 so as to be engaged in the engagement hole 43. The positioning pin 55 is housed, while being retained, for free radially-outward advancing/retracting movement in a component holding hole 56 formed radially in the component coupling member 33, and is urged radially outwardly by a coil spring (urging member) 57. In this structure, upon the extension component 29 being located in the transverse position X, the positioning pin 55 is disengageably engaged in the engagement hole 43 so as to restrain the cylindrical member 34 against circumferential movement relative to the component coupling member 33 and axial movement, thereby holding (locking) the extension component 29 in the transverse position X.

Figure 8:
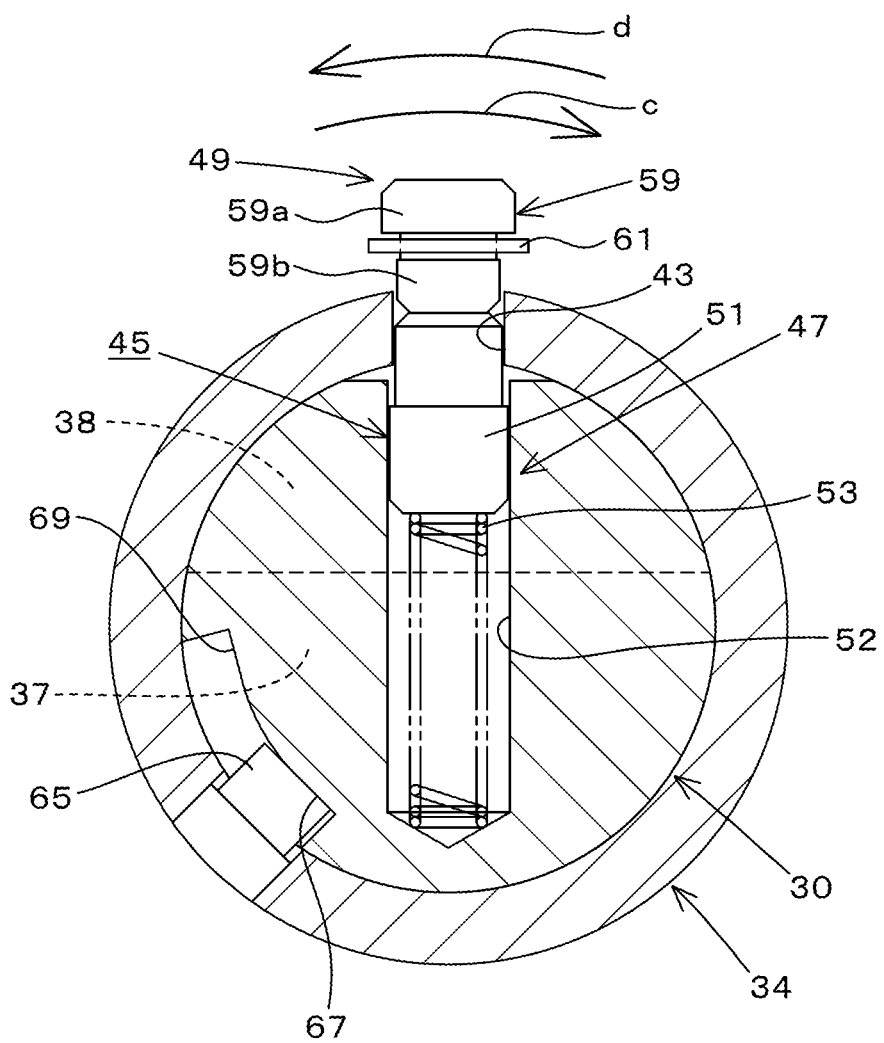
FIG. 8 is a sectional view taken along the line A-A shown in FIG. 3.

The release means 49 comprises: a support plate 61 attached to the cylindrical member 34; and a push pin 59 situated inside the engagement hole 43 while being supported by the support plate 61, which acts to push each of the positioning pins 51 and 55 out of the engagement hole 43 when pressed. As shown in FIG. 8, the push pin 59 comprises a head portion 59a and a pin shaft portion 59b, and is retained for free radial movement in the engagement hole 43, with the head portion 59a extended so as to lie outside of the cylindrical member 34.

Thus, the push pin 59 can be operated by pressing the head portion 59a from the outside of the extension component 29, and, by this push-pin 59 pressing operation, the positioning pin 51 or the positioning pin 55 engaged in the engagement hole 43 is pushed out of it, thereby achieving disengagement.

The support plate 61, which is constructed of a spring plate, is fixedly held between the cover member 35 and the cylindrical member 34 so as to protrude outward in a direction toward the handle main body 11, and has its protruding end bent so as to rise radially outwardly in a floating state from the cylindrical member 34, and, a head portion 59a—side part of the pin shaft portion 59b of the push pin 59 is inserted, while being retained, in that protruding end part. In this way, the support plate 61 supports the push pin 59 so as to prevent it from accidentally coming off from the engagement hole 43.

The guide means 63 comprises, as shown in FIGS. 3 to 8, a locking projection 65 formed in the cylindrical member 34 so as to project radially inwardly; a first circumferential groove 67 formed on the outer peripheral surface of the main body coupling member 30; a first linear groove 69 formed so as to extend axially from the first circumferential groove 67 to the end face of the main body coupling member 30; a second circumferential groove 68 formed on the outer peripheral surface of the component coupling member 33; and a second linear groove 70 formed so as to extend axially from the end face of the component coupling member 33 to a position beyond the second circumferential groove 68. The first circumferential groove 67 and the second circumferential groove 68 lock the locking projection 65 for free circumferential movement; the first linear groove 69 guides the locking projection 65 in axial movement; the second linear groove 70 assumes a position communicating with the first linear groove 69 in the longitudinal position Y, for guiding the locking projection 65 in axial movement from the end face of the component coupling member 33 to a position beyond the second circumferential groove 68.

At a time when the component coupling member 33 is brought into an extended state relative to the main body coupling member 30, by moving the cylindrical member 34 toward the main body coupling member 30 so as to be externally fitted in straddling relation to the main body coupling member 30 and the component coupling member 33, the locking projection 65 is moved from the second linear groove 70 into engagement in the first linear groove 69, and, by moving the cylindrical member 34 further toward the main body coupling member 30 until it abuts on the base end of the handle main body 11, the locking projection 65 is moved to an intersection point of the first linear groove 69 and the first circumferential groove 67. By moving the cylindrical member 34 in the circumferential direction (a direction c as shown in FIG. 8) from the intersection point, the locking projection 65 is disengaged from the first linear groove 69 and is whereafter engaged in the first circumferential groove 67.

By the circumferential movement of the cylindrical member 34 and the consequent engagement of the locking projection 65 with the back of the first circumferential groove 67, the positioning pin 51 is engaged in the engagement hole 43, thereby inhibiting the cylindrical member 34 from further circumferential movement. In this state, the extension component 29 is locked in the longitudinal position Y by the longitudinally positioning means 47.

Moreover, by moving the cylindrical member 34 in the opposite direction to the main body coupling member 30 so as to move the locking projection 65 from the first linear groove 69 into engagement in the second linear groove 70, the cylindrical member 34 is brought into a state where it is externally fitted to the component coupling member 33 alone, thereby allowing the component coupling member 33 to rotate about the pivot 31 relative to the main body coupling member 30.

With the component coupling member 33 bent at substantially a right angle, the cylindrical member 34 is moved toward the main body coupling member 30 so as to abut thereon relative to the component coupling member 33, whereupon the locking projection 65 is moved to a point of intersection with the second circumferential groove 68 in an intermediate part of the second linear groove 70. By moving the component coupling member 33 in the circumferential direction (the direction c shown in FIG. 8) from the intersection point, the locking projection 65 is disengaged from the second linear groove 70 and is whereafter engaged in the second circumferential groove 68.

By the circumferential movement of the cylindrical member 34 and the consequent engagement of the locking projection 65 with the back of the second circumferential groove 68, the positioning pin 51 is engaged in the engagement hole 43, thereby inhibiting the cylindrical member 34 from further circumferential movement. In this state, the extension component 29 is locked in the transverse position X by the transversely positioning means 48.

The following is a description about how to use the cutting tool 1.

Figure 3:
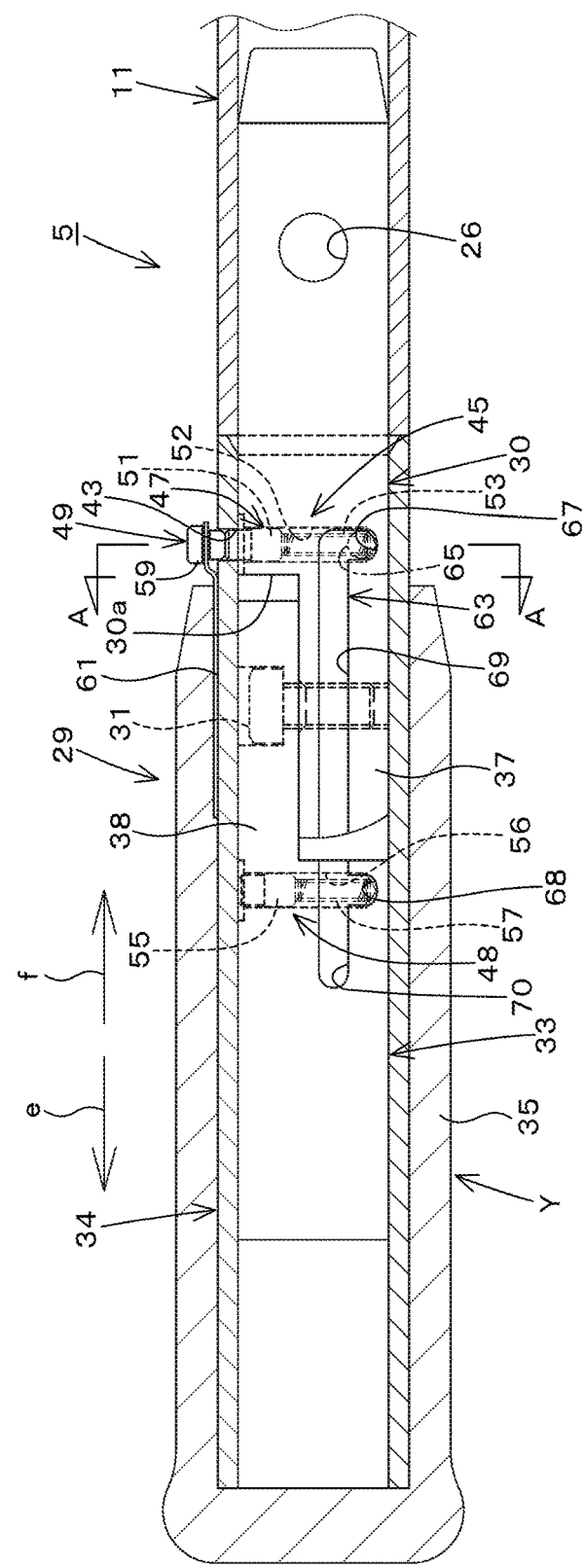
FIG. 3 is a sectional front view of a base end side of a first handle.

When the extension component 29 of the first handle 5 is locked in the longitudinal position Y as shown in FIG. 3, as shown in FIG. 8, the locking projection 65 is engaged with the back of the first circumferential groove 67, and the positioning pin 51 is engaged in the engagement hole 43.

Under this condition, in order to lock the extension component 29 in the transverse position X, firstly, the push pin 59 is pressed to push the positioning pin 51 into the main body coupling member 30 from the engagement hole 43 against an urging force exerted by the coil spring 53. Then, by moving the cylindrical member 34 circumferentially in a direction indicated by an arrow c, the locking projection 65 is disengaged from the first circumferential groove 67 and is whereafter engaged in the first linear groove 69, thereby permitting free axial movement of the cylindrical member 34 relative to the main body coupling member 30 and the component coupling member 33.

Figure 4:
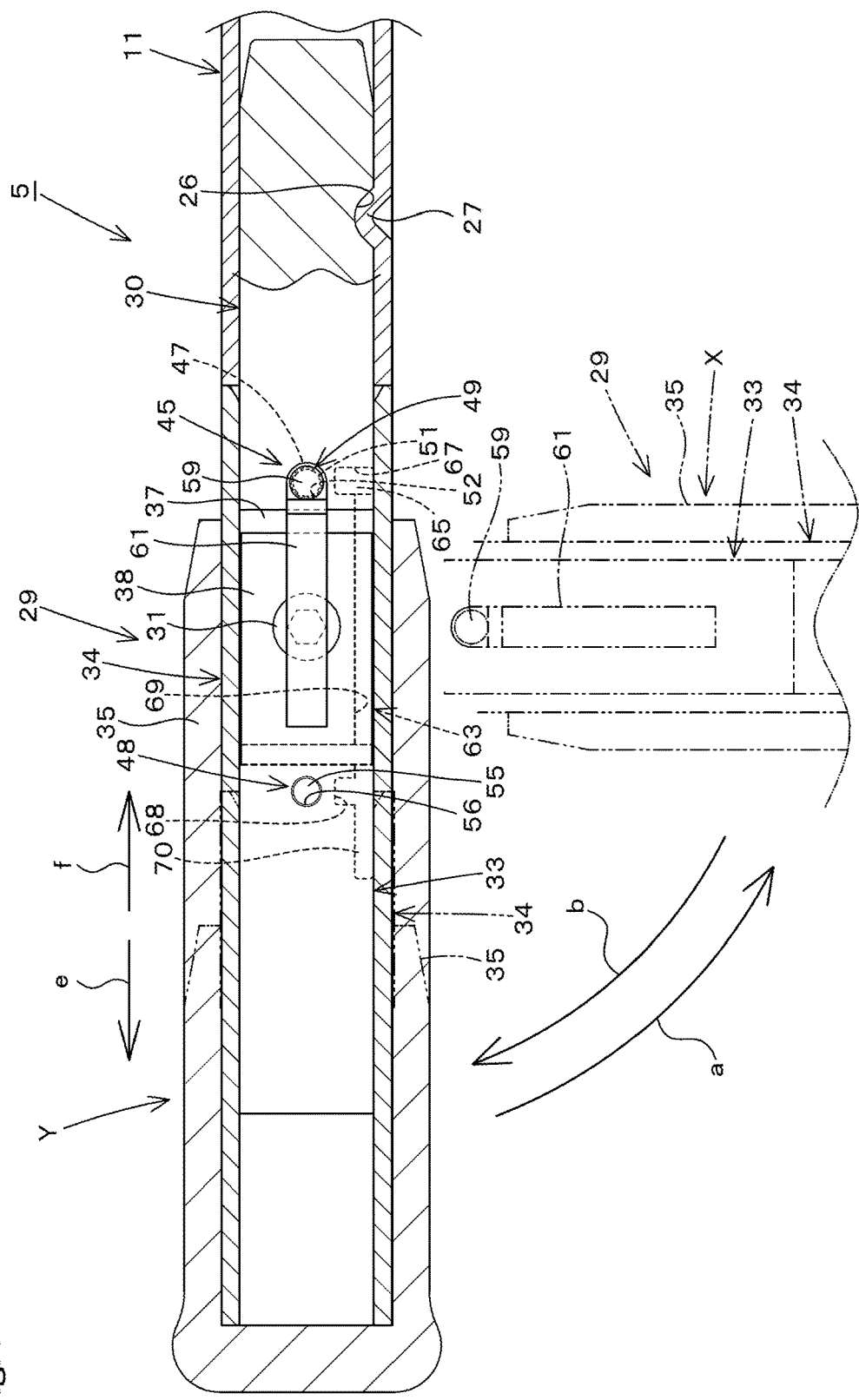
FIG. 4 is a sectional plan view of the base end side of the first handle, with the extension component set in the longitudinal position.

Next, the cylindrical member 34 is moved toward the base end of the component coupling member 33 (in a direction indicated by an arrow e) so as to be detached from the projecting end of the main body coupling member 30 as indicated by a chain double-dashed line in FIG. 4. At this time, the locking projection 65 is disengaged from the first linear groove 69, is engaged in the second linear groove 70, and is eventually moved to the rear end of the second linear groove 70. After that, the component coupling member 33 (extension component 29) is rotated about the pivot 31 in the arrow a direction relative to the main body coupling member 30, thereby bending the extension component 29 at a right angle with respect to the handle main body 11.

Then, the cylindrical member 34 is, after being moved toward the main body coupling member 30 (in a direction indicated by an arrow f) relative to the component coupling member 33 so as to abut on the projecting end of the main body coupling member 30, moved circumferentially in a direction indicated by an arrow d relative to the component coupling member 33, thereby causing the locking projection 65 to find its way into the second circumferential groove 68 from the intermediate part of the second linear groove 70, and then engage with the back of the second linear groove 70. Moreover, the positioning pin 55 is engaged in the engagement hole 43, whereupon the extension component 29 is locked in the transverse position X.

Figure 5:
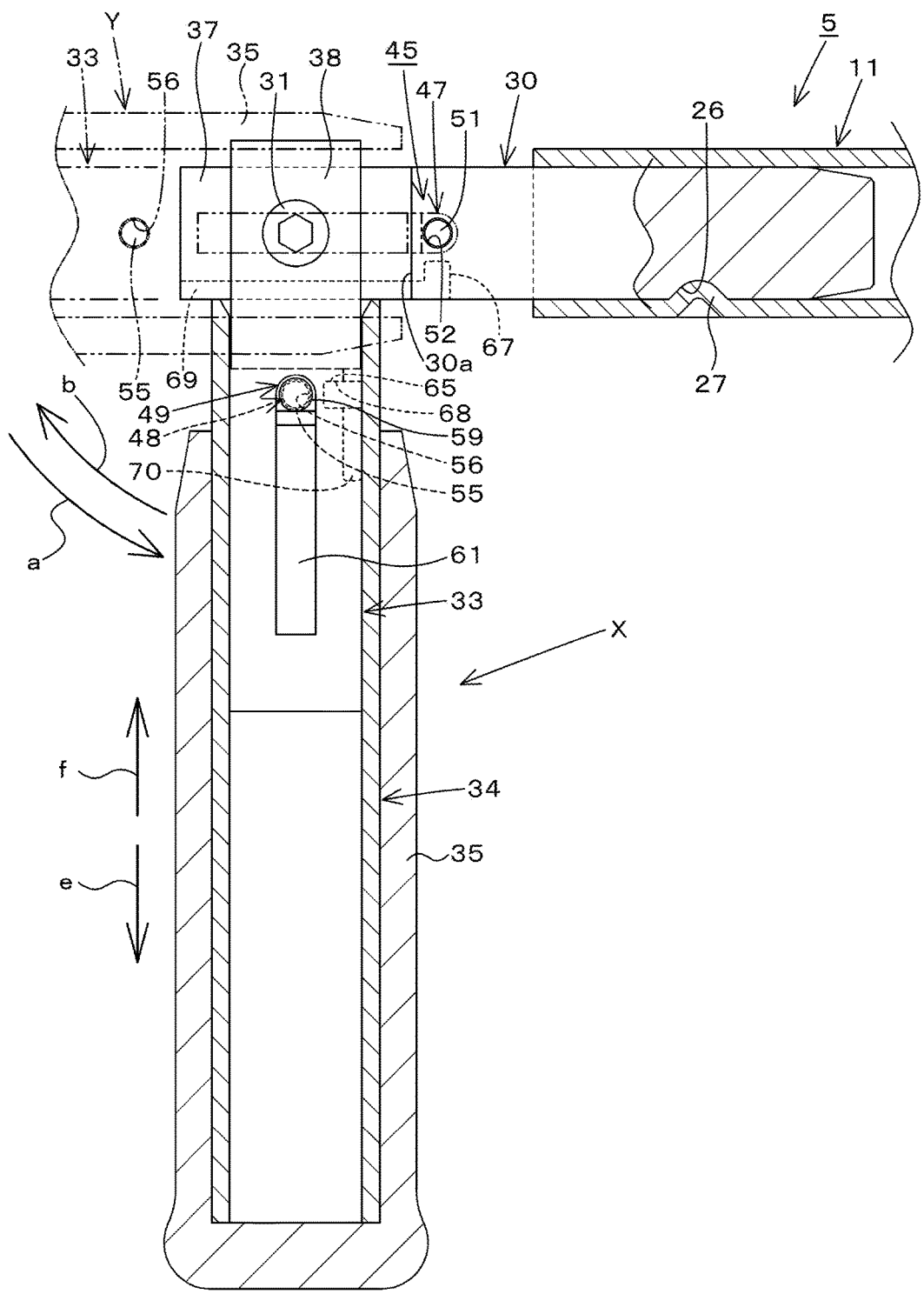
FIG. 5 is a sectional plan view of the base end side of the first handle, with the extension component set in the transverse position.
Figure 6:
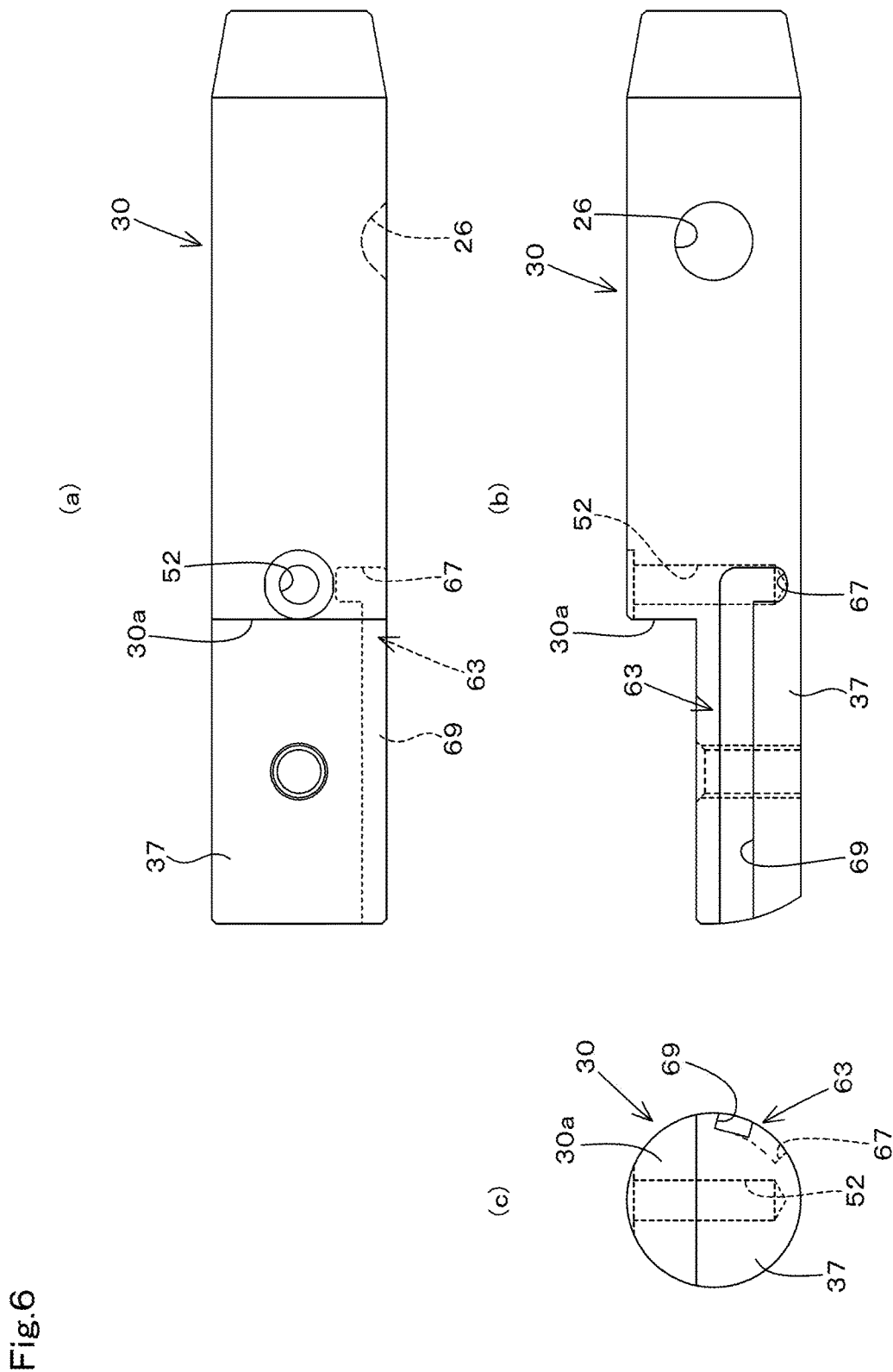
FIG. 6 shows a main body coupling member, and more specifically FIG. 6(*a*) is a plan view, FIG. 6(*b*) is a front view, and FIG. 6(*c*) is a side view.
Figure 7:
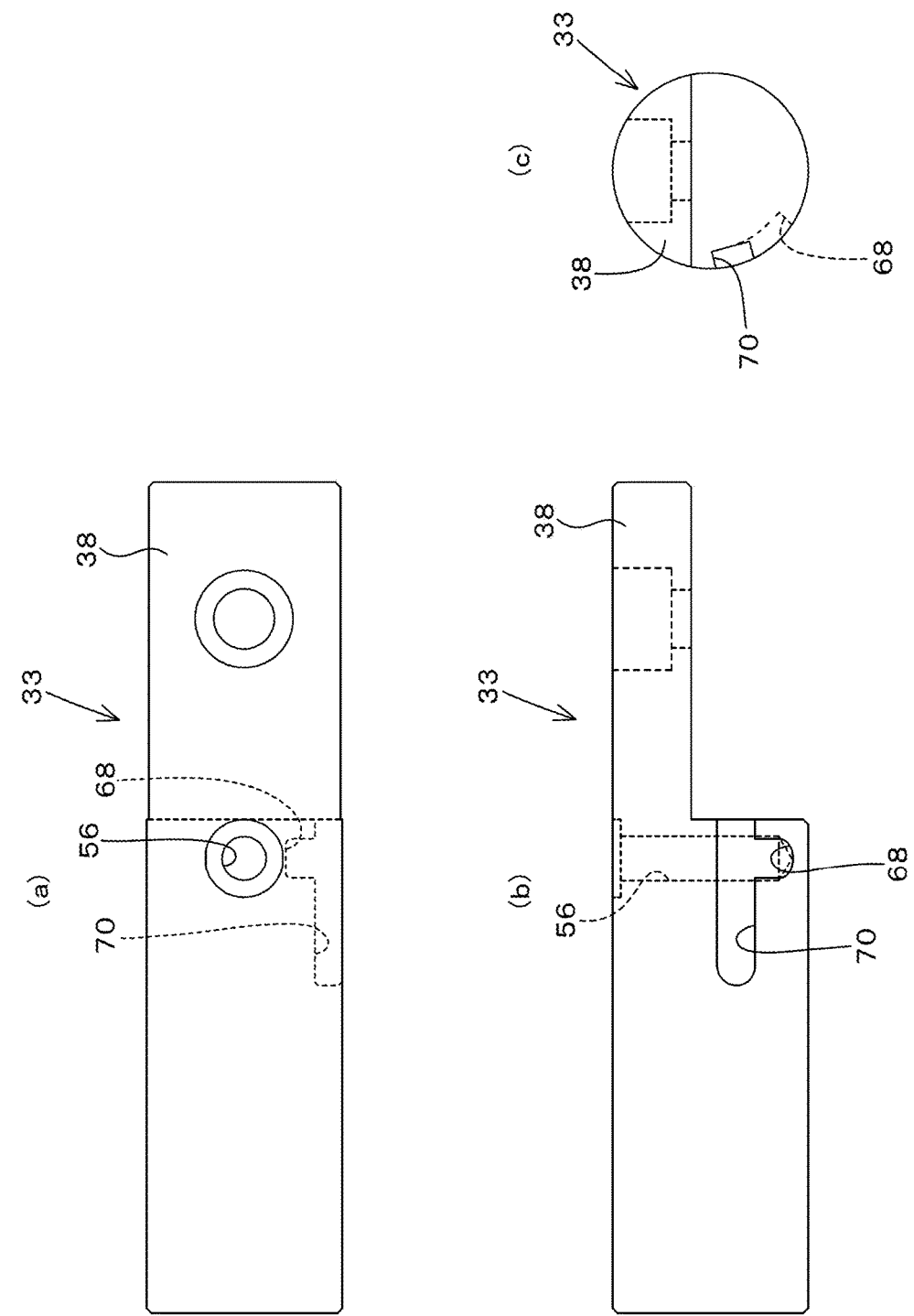
FIG. 7 shows a component coupling member, and more specifically FIG. 7(*a*) is a plan view, FIG. 7(*b*) is a front view, and FIG. 7(*c*) is a side view.

In order to change the position of the extension component 29 of the first handle 5 locked in the transverse position X as shown in FIG. 5 to the longitudinal position Y, firstly, the push pin 59 is pressed to move the cylindrical member 34 circumferentially in the arrow c direction as shown in FIG. 8, so that the positioning pin 55 is disengaged from the engagement hole 43, and the locking projection 65 is disengaged from the second circumferential groove 68 and is whereafter engaged in the second linear groove 70. Then, the cylindrical member 34 is moved away from the coupling projection 37 until the locking projection 65 engages with the back of the second linear groove 70.

Next, after rotationally moving the component coupling member 33 about the pivot 31 in the arrow b direction to locate the extension component 29 in the longitudinal position, as shown in FIG. 4, the cylindrical member 34 is moved toward the main body coupling member 30 (in the arrow f direction) so as to abut on the handle main body 11. After that, the cylindrical member 34 is moved circumferentially in the arrow d direction, whereupon the locking projection 65 is engaged with the back of the first circumferential groove 67, and also the positioning pin 55 is engaged in the engagement hole 43, thereby locking the extension component 29 in the longitudinal position Y.

That is, a change in position of the extension component 29 necessitates a push-pin 59 pressing step, circumferential movement, axial movement, rotation, axial movement, and circumferential movement in the order presented, and, the axial movement cannot be achieved without effecting the circumferential movement, and also the rotation cannot be achieved without effecting the axial movement. Inconsequence, three-step operation is required. This makes it possible to prevent an accidental change in position, as well as to lock the extension component 29 in each of the positions without fail.

Thus, in a case where a material to be cut is hard or thick, by locking the extension component 29 of the first handle 5 in the transverse position X relative to the handle main body 11, the first handle 5 can be set stably by utilizing the extension component 29, wherefore an operator is able to cut the to-be-cut material with ease simply by grasping only the second handle 6 with his/her hands while pushing down the first handle 5 placed in a stable condition by his/her foot.

On the other hand, in a case where a material to be cut is soft or slim, by locking the extension component 29 of the first handle 5 in the longitudinal position Y relative to the handle main body 11, the first handle can be changed from a stably-set mode to a grippable mode as with the second handle, wherefore an operator is able to cut the to-be-cut material quickly with ease simply by grasping the first handle 5 and the second handle 6 with his/her hands.

Figure 9:
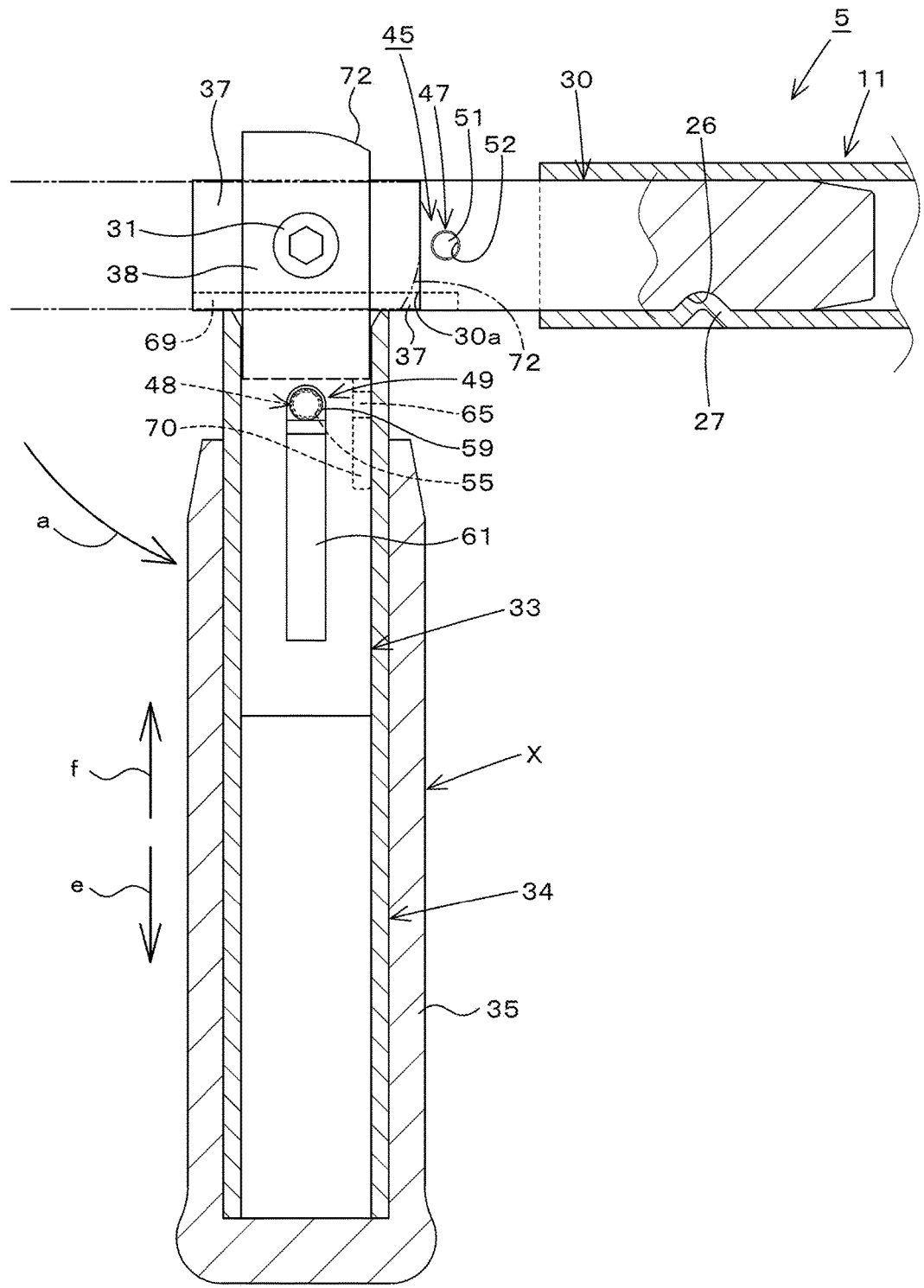
FIG. 9 is a sectional plan view showing the second embodiment.

In FIG. 9, there is shown the second embodiment in which the front end of the half-round bar-shaped coupling projection 38 of the component coupling member 33 abuts on the step end face 30a of the main body coupling member 30, and, one of the corners of the front end is radiused to form an arcuate chamfer 72, the center of curvature of which is coincident with the pivot 31.

Accordingly, the component coupling member 33 is allowed to rotate about the pivot 31 only in the arrow a direction for a change in position from the extended state relative to the main body coupling member 30, and is not allowed to rotate in a reverse direction.

In the guide means 63, the main body coupling member 30 is formed with the first linear groove 69, and the component coupling member 33 is formed with the second linear groove 70, but no circumferential groove is formed therein. The locking projection 65 formed in the cylindrical member 34 is allowed to move only axially and linearly within the first linear groove 69 and the second linear groove 70. Upon engagement of the locking projection 65 with the back of the first linear groove 69, the longitudinally positioning means 47 is actuated to locate the extension component 29 in the longitudinal position Y, and, when the locking projection 65 is engaged with the back of the second linear groove 70, the extension component 29 is allowed to rotate freely, and also, when the locking projection 65 lies in an intermediate part of the second linear groove 70, the cylindrical member 34 abuts on the coupling projection 37, and the transversely positioning means 48 is actuated to locate the extension component 29 in the transverse position X.

In the cutting tool 1 implemented as the second embodiment, the position of the extension component 29 can be changed by release operation of the release means 49 and linear movement of the extension component 29; that is, a construction based on two-step operation is adopted.

It should be noted that the present invention is not limited to the embodiments as described hereinabove. For example, the handle main body 11 may be formed with a rearwardly-extending hole and a sidewardly-extending hole for insertion of the component coupling member 33, and, in this case, the extension component 29 is detachably secured to the handle main body 11 so as to be freely changed in position between the transverse position X which is substantially aligned with the axial direction of the pivotal shaft 17 and the longitudinal position Y which is aligned with the lengthwise direction of the handle main body by the attachment to and detachment from the handle main body 11.

Moreover, the position holding mechanism 45 for holding the extension component 29 in each of the transverse position X and the longitudinal position Y is not limited to the structure suggested in the afore stated embodiment, but may be implemented via another means, for example, a fastening component such as a bolt or nut, a detachable engagement structure, or otherwise.

EXPLANATION OF REFERENCE SYMBOLS 1 cutting tool
3 cutting blade body
4 cutting blade body
5 first handle
6 second handle
11 handle main body
17 pivotal shaft
29 extension component
30 main body coupling member
31 pivot
33 component coupling member
34 cylindrical member
43 engagement hole
45 position holding mechanism
47 longitudinally positioning means
48 transversely positioning means
49 release means
51 positioning pin
55 positioning pin
59 push pin
63 guide means
65 locking projection
67 first circumferential groove
68 second circumferential groove
69 first linear groove
70 second linear groove
X transverse position
Y longitudinal position

The invention claimed is:

1. A cutting tool comprising:
   a first handle and a second handle coupled to each other via a pivotal shaft; and
   cutting blade bodies coupled to front end sides of, respectively, the first and second handles;
   wherein the first handle comprises:
      a handle main body whose dimension from the pivotal shaft to a base end of the handle main body is longer than a dimension from the pivotal shaft to a front end of the cutting blade body; and
      an extension component coupled to the base end side of the handle main body of the first handle, said extension component being installed so that, with respect to the handle main body of the first handle, said extension component can be changed in position between a longitudinal position which extends in a lengthwise direction of the handle main body of the first handle and a transverse position which sidewardly protrudes from the handle main body of the first handle and is substantially aligned with an axial direction of said pivotal shaft,
   wherein said extension component comprises:
      a component coupling member coupled, via a pivot, to a main body coupling member disposed at the base end of the handle main body of the first handle, the pivot being substantially perpendicular to the pivotal shaft; and
      a cylindrical member fitted slidably and externally to the component coupling member, the cylindrical member being configured to engage with the main body coupling member so as to assume the longitudinal position,
   wherein said extension component is allowed to rotate about the pivot upon disengagement of the cylindrical member from the main body coupling member, upon rotating about the pivot, said extension component can be changed to the transverse position, and said extension component is restrained against rotation about the pivot upon abutting of a front end of the cylindrical member on the main body coupling member in the transverse position, and
   wherein a position holding mechanism is disposed between the extension component and the handle main body of the first handle for restraining the cylindrical member against movement relative to the main body coupling member when the extension component is in the longitudinal position, and for restraining the cylindrical member against movement relative to the component coupling member when the extension component is in the transverse position.

2. The cutting tool according to claim 1, wherein said second handle comprises, at its base end side, a grippable handle grip, and
   wherein the extension component of said first handle is brought into a stably-set mode of being pushable down with a foot when the extension component is in the transverse position, and serves as a grippable handle when the extension component is in the longitudinal position.

3. The cutting tool according to claim 1,
   wherein said position holding mechanism comprises:
   longitudinally positioning means for restraining the cylindrical member against movement relative to the main body coupling member when the extension component is in the longitudinal position;
   transversely positioning means for restraining the cylindrical member against movement relative to the component coupling member when the extension component is in the transverse position; and
   release means disposed in the extension component, for releasing restraint imposed by the longitudinally positioning means and the transversely positioning means.

4. The cutting tool according to claim 3,
   wherein the cylindrical member of said extension component is formed with an engagement hole,
   wherein said longitudinally positioning means has a positioning pin which protrudes from an interior of the main body coupling member so as to be engaged in the engagement hole,
   wherein said transversely positioning means has a positioning pin which protrudes from an interior of the component coupling member so as to be engaged in the engagement hole,
   and wherein said release means has a push pin situated inside the engagement hole, which acts to push each of the positioning pins out of the engagement hole when pressed.

5. The cutting tool according to claim 1,
   wherein said position holding mechanism has guide means for causing the cylindrical member to move circumferentially relative to the main body coupling member in the longitudinal position and whereafter permitting axial movement of the cylindrical member, and also causing the cylindrical member to move circumferentially relative to the component coupling member in the transverse position and whereafter permitting its axial movement of the cylindrical member.

6. The cutting tool according to claim 5,
wherein said guide means comprises:
a locking projection formed in the cylindrical member;
a first circumferential groove and a second circumferential groove for retaining the locking projection formed in the main body coupling member and the component coupling member, respectively;
a first linear groove for guiding the locking projection in axial movement from the first circumferential groove to an end face of the main body coupling member; and
a second linear groove which is positioned so as to become an extension of the first linear groove in the longitudinal position, for guiding the locking projection in axial movement from an end face of the component coupling member to a position beyond the second circumferential groove.

* * * * *